United States Patent [19]
Esposito et al.

[11] Patent Number: 6,135,543
[45] Date of Patent: Oct. 24, 2000

[54] AIR EXHAUST AND WATER MANAGEMENT SYSTEM FOR A MOTOR VEHICLE

[75] Inventors: Scott A. Esposito, Rochester Hills; Jeffrey E. Snyders, Wixom, both of Mich.; Hari K. Kosaraju, Rockford, Ill.

[73] Assignee: DaimlerChrysler Corporation, Auburn Hills, Mich.

[21] Appl. No.: 09/252,142

[22] Filed: Feb. 18, 1999

[51] Int. Cl.[7] .................................................. B60H 1/00
[52] U.S. Cl. ...................................... 296/208; 296/190.09
[58] Field of Search ............................... 296/190.09, 192, 296/208, 213; 454/339, 340, 70, 69

[56] References Cited

U.S. PATENT DOCUMENTS

| | | | |
|---|---|---|---|
| 3,158,176 | 11/1964 | Toland | 296/208 X |
| 3,666,316 | 5/1972 | Wilfert . | |
| 4,518,197 | 5/1985 | Gallitzendorfer et al. . | |
| 4,752,096 | 6/1988 | Ishikawa | 296/37.16 |
| 4,946,219 | 8/1990 | Okai et al. . | |
| 5,149,170 | 9/1992 | Matsubara et al. . | |

FOREIGN PATENT DOCUMENTS

| | | | |
|---|---|---|---|
| 1066372 | 4/1967 | United Kingdom | 296/208 |
| 1509177 | 4/1967 | United Kingdom | 296/208 |

*Primary Examiner*—D. Glenn Dayoan
*Assistant Examiner*—Jason Morrow
*Attorney, Agent, or Firm*—Marc Lorelli

[57] ABSTRACT

An air exhaust and water management system for a motor vehicle to allow air to flow out of the vehicle cabin and to restrict air and water from flowing into the vehicle cabin is provided. The system includes a vehicle body having an aperture formed therein. The system also includes an air exhauster received in the aperture including outboard actuating flaps to allow air to flow out of the cabin while restricting air from flowing into the vehicle. The system also includes a water diverter nested between the air exhauster and the vehicle body to collect and funnel water out of the cabin that may have entered the cabin through the aperture in the body.

7 Claims, 3 Drawing Sheets

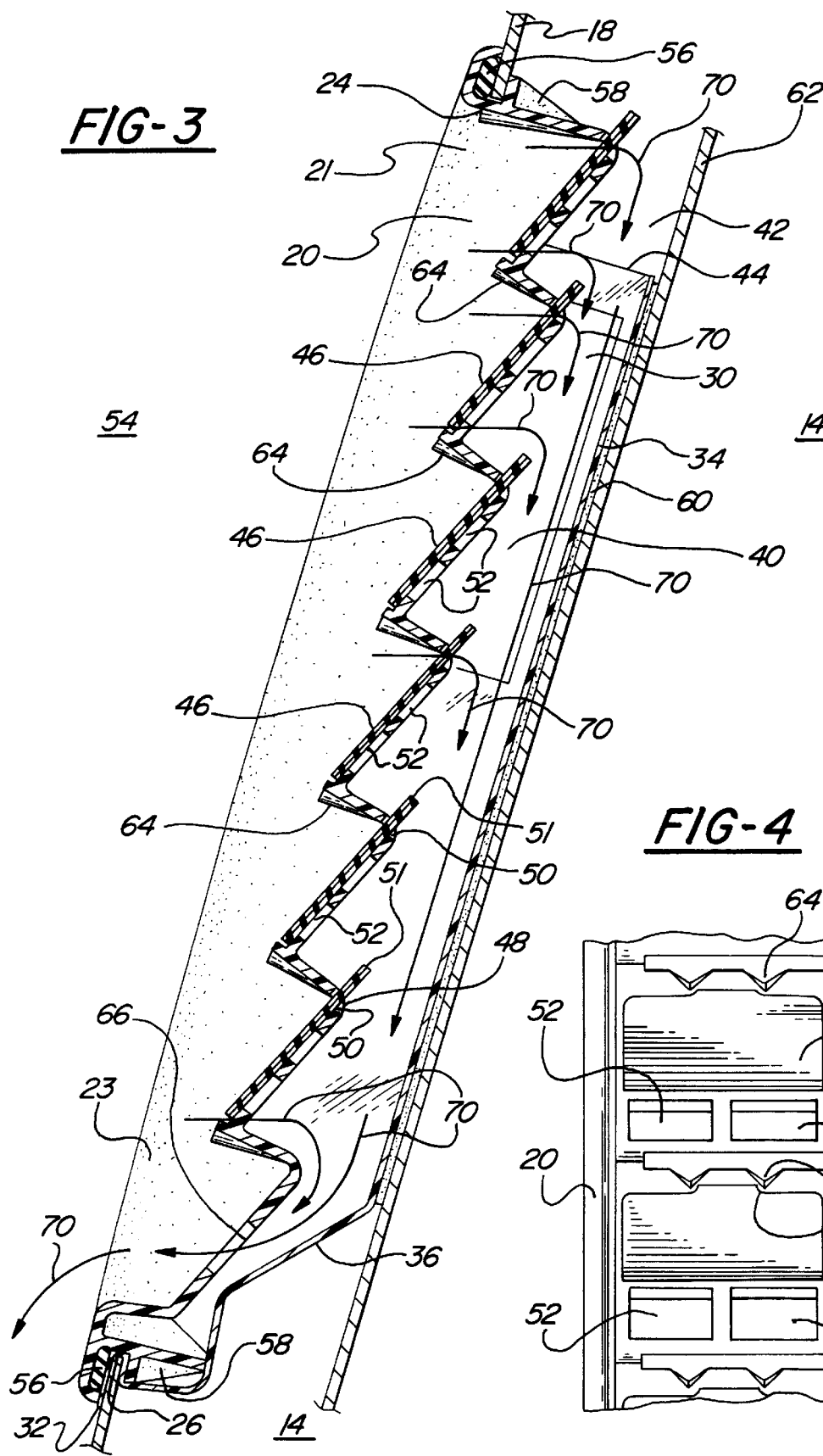
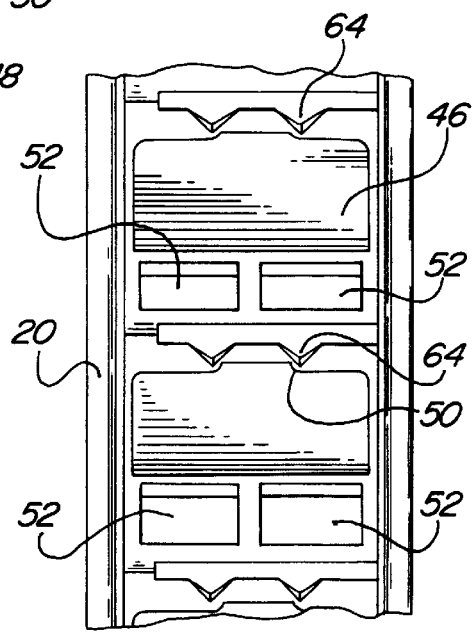

AIR EXHAUST AND WATER MANAGEMENT SYSTEM FOR A MOTOR VEHICLE

BACKGROUND OF THE INVENTION

1. Technical Field

The present invention generally relates to air exhaust system on a motor vehicle. More particularly, the present invention relates to an air exhaust and water management system to prevent water from entering into the vehicle and to allow proper air exhaust for the heating and air conditioning system.

2. Discussion

Most motor vehicles today are equipped with some type of air exhaust system such that the cabin pressure is maintained at roughly ambient pressure while the heating or air conditioning system is operating. This air exhaust system must be constructed to allow air to flow out of the cabin while preventing substantial amounts of outside air from following into the cabin. If substantial amounts of outside air were allowed to flow freely into the cabin; then the effectiveness of a heating or air conditioning system would be decreased. Conversely, if only small amounts of air are allowed to leave the cabin, the performance of the heating and air conditioning system will be diminished.

It is known to equip a vehicle with an air exhaust system having an air exhauster disposed in an aperture of the vehicle body. A typical air exhauster comprises a plurality of outboard actuating flaps and a plurality of air passages. These flaps naturally rest in a position to block or restrict the air passages and can pivot to remove the restriction to the air passages. As the pressure in the cabin increases, a pressure gradient is created between the cabin and the outside air. A substantial pressure gradient will cause air to flow through the air passages, thereby causing the flaps to pivot outboard to open. Once the pressure gradient is diminished, the flaps, by gravity, will pivot closed. This system has proved to be adequate for air exhaust systems for motor vehicles.

Exhauster systems normally fit in an aperture in the body of a vehicle with a perimeter of the exhauster system sealing against the vehicle body. However, vehicle body tolerances and exhauster tolerances can lead to conditions whereby the seal is not formed properly. This condition will allow water to seep between the exhauster and the vehicle body through the aperture and into the vehicle. The inherent nature of the aforementioned outboard actuating flaps will also allow some water to pass through the aperture as well. There is a need, therefore, to provide an exhauster system that prevents water from entering the cabin of a vehicle.

Accordingly, it is a principal objective of the present invention to provide an air exhaust and water management system to prevent water from entering into the vehicle cabin and to allow proper air exhaust for the heating and air conditioning system.

It is another objective to provide a cost-effective method for providing an air exhaust and water management system.

It is yet another objective of the present invention to provide a system for keeping air and water from entering the cabin while allowing air to exit the cabin.

It is a further objective of the present invention to provide a water diverter to collect and funnel water out of a vehicle that may have entered through an aperture in the body of the vehicle.

SUMMARY OF THE INVENTION

In one form, the present invention provides an air exhaust and water management system for a motor vehicle to allow air to flow out of the vehicle cabin and to restrict air and water from flowing into the vehicle cabin. The system includes a vehicle body having an aperture formed therein. The system also includes an air exhauster received in the aperture and having outboard actuating flaps to allow air to flow out of the cabin while restricting air from flowing into the vehicle. The system also includes a water diverter disposed between the air exhauster and the vehicle body to collect and funnel water out of the vehicle cabin that may have entered the through the aperture in the vehicle body.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a sectional view along the line 3—3 of FIG. 1; and

FIG. 4 is an elevated view of an air exhauster according to this invention illustrating two flaps in the outboard actuated or open position.

DETAILED DESCRIPTION OF THE PREFERRED EMBODIMENT

Figure 1:
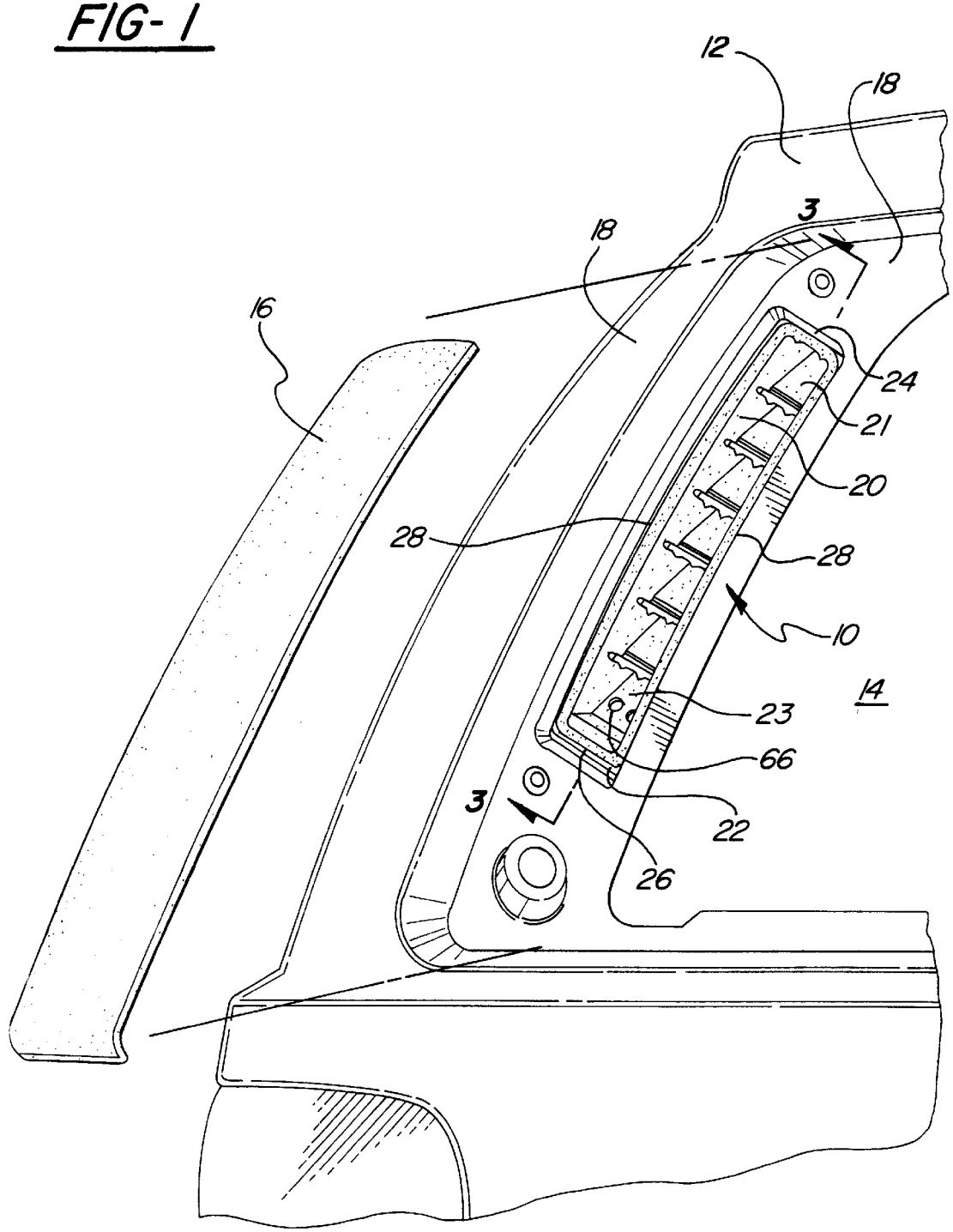
FIG. 1 is a partially exploded perspective view illustrating the upper right rear portion of a vehicle body with a trim cover removed.

Turning first to the partially exploded perspective view of FIG. 1, an air exhaust and water management system 10 is shown. The air exhaust and water management system 10 prevents water from entering into vehicle 12 and allows proper air exhaust for the heating and air conditioning system of the vehicle. The heating and air conditioning system (not shown) is located within cabin 14 of vehicle 12. The air exhaust and water management system 10 includes an air exhauster 20 and a water diverter 30 disposed within an aperture 22 formed in body 18 of vehicle 12.

Trim cover 16 is attached to vehicle body 18 concealing the air exhaust and water management system 10. Trim cover 16 is attached to body exterior 18 by clips (not shown). Air exhauster 20 is disposed to cover aperture 22 of body 18. Aperture 22 extends in a substantially vertical direction with a slight forward tilt. Aperture 22 is defined by a top edge 24, bottom edge 26, and side edges 28. Exhauster 20 includes a top end 21 and a bottom end 23 at opposing sides of the exhauster 20. Top end 21 is adjacent to the top edge 24 of aperture 22 when exhauster 20 is received in aperture 22. Conversely, bottom end 23 is adjacent to the bottom edge 26 of aperture 22.

Figure 2:
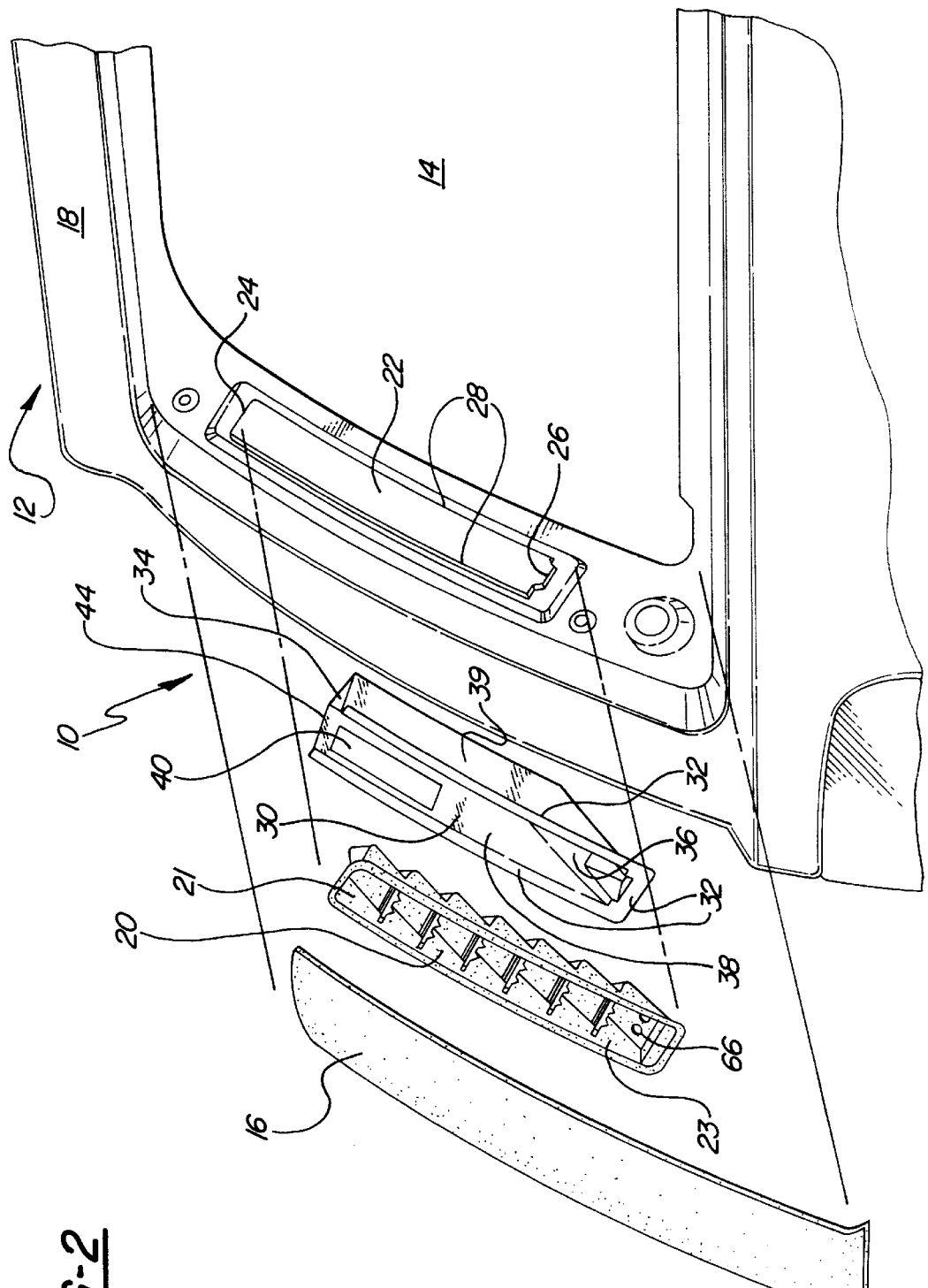
FIG. 2 is a perspective exploded view illustrating the upper right rear portion of a vehicle body, a water diverter, an air exhauster, and a trim cover.

A water diverter 30, illustrated in an exploded fashion in FIG. 2, is disposed in a nested arrangement between air exhauster 20 and vehicle body 18. Water diverter 30 is shaped generally as a U-shaped channel having a back 34, first and second sides 38 and 39 extending generally perpendicular to back 34 and bottom or funnel plate 36 which extends from back 34 at an oblique angle. Water diverter 30 has flanges 32 on the outer edge of sides 38, 39 and funnel plate 36. Surface 38 is slightly higher than side surface 39 due to the angle at which the system 10 is oriented on vehicle 12. Side surface 38 has an opening 40. Diverter 30 is shorter in length than exhauster 20, which creates an additional opening 42 adjacent top end 21 of exhauster 20. Opening 42 creates a rim 44 disposed vertically below and extends horizontally inboard further than the top edge 24 of aperture 22, as best shown in FIG. 3.

FIG. 3 provides a sectional view through air exhaust and water management system 10. Exhauster 20 has a seal 56 about its periphery. Clips 58 are provided to form a locking attachment between exhauster 20 and body exterior 18, with flanges 32 of diverter 30 nested therebetween. Diverter 30 is illustratively made of polypropylene although it can be appreciated that many different materials may be suitable. Diverter 30 is illustratively affixed in place by an adhesive 60. In the exemplary embodiment, adhesive 60 disposed on portions of the back surface 34 and flanges 32. Back 34 is adapted to contact body interior metal 62, and flanges 32 are adapted to contact bottom edge 26 and side edges 28.

Exhauster 20 further includes outboard actuating flaps 46 pivotably mounted at one end to exhauster 20, such as by portions 51 received in slots 50. Flaps 46 are adapted to pivot about slots 50. This allows for flaps 46 to be pivoted or actuated outboard, thereby removing the restriction of flap 46 to passageway 52, which can be best seen in FIG. 4.

In operation, higher pressure in cabin 14 of vehicle 12 than outside air 54 causes air to flow into passageway 52. When the pressure gradient gets high enough, the flow or air through passageway 52 will cause the outboard actuation of flaps 46, as shown in FIG. 4. As the pressure equalizes, flaps 46 will return, by gravity, to the position restricting passageway 52 illustrated in FIG. 3. FIG. 4 further illustrates two flaps 46 in a direct view of the outboard actuated or open position. A plurality of V-shaped stops 64 are disposed so as to contact flaps 46 in their most fully actuated positions (Not Shown). These V-shaped stops 64 act to prevent flaps 46 from sticking to exhauster 20.

It can be appreciated that water may enter through various portions of exhauster 20. These water entry locations could be due to poor fit between the body 18 and the exhauster 20 or even excessive tolerances within the exhauster 20 itself. Diverter 30 is provided to collect any water and funnel it towards bottom end 23 of exhauster 20 through exiting hole 66. It can also be appreciated that diverter 30, is disposed in areas that are within the probable gravitational flow of water, shown by arrows 70. Other areas are left open, for example opening 42, defined by rim 44 and void 40, to keep the restriction of air flow to a minimum. Without proper air exhaust, the effectiveness of exhauster 20 is limited.

While the above description constitutes the preferred embodiment of the invention, it will be appreciated that the invention is susceptible to modification, variation, and change without departing from the proper scope or fair meaning of the accompanying claims.

What is claimed is:

1. A air exhaust and water management system for a motor vehicle having a vehicle cabin, said system comprising:

a vehicle body having an aperture formed therein;

an air exhauster received in said vehicle body aperture, said air exhauster including outboard actuating flaps to allow air to flow out of said aperture of said vehicle body and to restrict air from flowing into said aperture; and a water diverter disposed between said air exhauster and said vehicle body, said diverter adapted to collect and funnel water out of the vehicle cabin that may have entered through said aperture.

2. The invention as set forth in claim 1, wherein said water diverter includes a void to allow for proper air exhaust to reach said air exhauster.

3. The invention as set forth in claim 2, wherein said air exhauster includes at least one exiting hole.

4. The invention as set forth in claim 3, wherein said water diverter is adapted to funnel water out of said exiting hole of said exhauster.

5. The invention as set forth in claim 4, wherein said water diverter includes a rim defining an opening, said rim disposed vertically below and horizontally inboard of said top edge of said aperture.

6. A air exhaust and water management system for a motor vehicle, said motor vehicle including a cabin, said air exhaust and water management system comprising:

a vehicle body having a aperture formed therein, said aperture extending in a substantially vertical position and defined by a top edge and a bottom edge; said top edge disposed inboard of said bottom edge, said top edge disposed inboard of said bottom edge;

an air exhauster having a top end and a bottom end, each of said ends having clips to attach said air exhauster to said vehicle body, said air exhauster including outboard actuating flaps designed to allow air to flow out of said vehicle body via said aperture and to restrict air from flowing into said vehicle body via said aperture; and a water diverter nested between said air exhauster and said vehicle body, said diverter forms a water tight seal with said vehicle body, said diverter includes an opening adjacent said top end of said aperture to allow air to flow to said exhauster from the cabin of the vehicle, said opening of said diverter forming a rim, said rim disposed vertically below and extend horizontally inboard further than said top edge of said aperture, said diverter forming a funnel to channel water towards said bottom end;

wherein said air exhauster includes an exiting hole near said bottom end to allow water to flow out of said vehicle body after said diverter channels the water towards said bottom end.

7. The invention as set forth in claim 6, wherein said water diverter includes an opening to allow for proper air exhaust to reach said air exhauster.

* * * * *